(12) United States Patent
Strater et al.

(10) Patent No.: US 12,342,187 B2
(45) Date of Patent: Jun. 24, 2025

(54) STEERING TO OPTIMIZE PERFORMANCE IN MESH NETWORKS

(71) Applicant: Ruckus IP Holdings LLC, Claremont, NC (US)

(72) Inventors: Jay Strater, San Diego, CA (US); Diwya Kandagath Mohanan, Karnataka (IN); Chethan Alur Gurumallappa, Karnataka (IN); Paul Baker, San Diego, CA (US); Gregory Nakanishi, San Diego, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 358 days.

(21) Appl. No.: 17/744,066

(22) Filed: May 13, 2022

(65) Prior Publication Data

US 2023/0059363 A1 Feb. 23, 2023

Related U.S. Application Data

(60) Provisional application No. 63/232,308, filed on Aug. 12, 2021.

(51) Int. Cl.
*H04W 24/02* (2009.01)
*H04W 36/00* (2009.01)
*H04W 84/18* (2009.01)

(52) U.S. Cl.
CPC ..... *H04W 24/02* (2013.01); *H04W 36/00837* (2018.08); *H04W 84/18* (2013.01)

(58) Field of Classification Search
CPC .......... H04W 24/02; H04W 36/00837; H04W 36/24; H04W 36/0022; H04W 24/10;
(Continued)

(56) References Cited

U.S. PATENT DOCUMENTS

| | | | |
|---|---|---|---|
| 2015/0289181 A1* | 10/2015 | Bromell | H04W 36/24 455/436 |
| 2021/0168686 A1 | 6/2021 | Strater et al. | |
| 2022/0279405 A1* | 9/2022 | Haghani | H04W 36/00837 |

OTHER PUBLICATIONS

International Search Report and the Written Opinion of the International Searching Authority dated Aug. 1, 2022 in International (PCT) Application No. PCT/US2022/029209.
(Continued)

*Primary Examiner* — Anez C Ebrahim
(74) *Attorney, Agent, or Firm* — Myers Bigel, P.A.

(57) ABSTRACT

A steering controller of an access point device can provide an optimized network environment or performance by steering a target client device to a basic service set (BSS) of a network device that is different from the current BSS of the target client device based on one or more non-associated client (NAC) link quality parameters to the BSS on the network device. The steering controller can identify the target client device based on a steering condition. A delta link quality can be determined based on the NAC link quality parameters and the target link quality parameters associated with the target client device. The steering controller can send one or more steering instructions to the target client device if a candidate BSS is identified based on a comparison between a determined maximum difference between a NAC link quality parameter and a target link quality parameter and an associated threshold.

20 Claims, 6 Drawing Sheets

(58) Field of Classification Search
CPC ........... H04W 36/144; H04W 36/0088; H04W 36/0061
See application file for complete search history.

(56) References Cited

OTHER PUBLICATIONS

International Preliminary Report on Patentability issued Feb. 13, 2024 in corresponding International (PCT) Application No. PCT/US2022/029209.

* cited by examiner

STEERING TO OPTIMIZE PERFORMANCE IN MESH NETWORKS

BACKGROUND

Many network environments include multiple network devices, such as a gateway, an access point, an extender, various client devices, etc. For example, a network environment can be a mesh network where various network devices act as a single wireless fidelity (Wi-Fi) network. Generally, a wi-fi network with a mesh service contains a network device (such as a gateway) and one or more wireless extender devices. A controller typically resides in the gateway and is involved in discovery and configuration of the gateway and extender device's radio access points of a basic service set (BSS) that can be associated with an extended service set (ESS). An ESS shares a service set identifier (SSID) encryption type and preshared key (PSK) with the BSS. The controller is also typically involved in determining if a client device or client station which is associated on the BSS should be moved and/or steered to another BSS and, if so, executing the client steer.

Several conditions can reactively prompt a controller to determine that a client device or client station (STA) should be or needs to be steered. The conditions can comprise poor link quality (such as low received signal strength indicator (RSSI), received channel power indicator (RCPI), or physical layer (PHY) rate) with the associated BSS, high fronthaul (FH) channel utilization on the associated BSS, and high link utilization from the back-haul (BH) to the BH-BSS of the upstream device. In addition, the controller can proactively try to steer a client device or client station for radio band purposes from a first association (for example, a 2.4 gigahertz (GHz) radio BSS association) to a second association (for example, a 5 GHz radio BSS association or a 6 GHz radio BSS association) if the controller determines that the client device or client station is better served by the second association based on the conditions (such as link quality or utilization issues).

Reacting to issues associated with conditions experienced by a client device is key to addressing situations where the client device continues being associated with a BSS even when such association provides poor network performance or even no network connection (a "sticky client" problem). An optimized network is one in which a client device or client station is pushed to steer to a BSS that provides an improved network experience, for example, where the client device or client station experiences an improved or higher throughput (and lower latency) when BSS utilization conditions all the steering. The steering can also result in users or operators complaining that a client device remains connected to an access point in another location even though the client device has been moved to a new access point that is next to or in close proximity of the client device.

For example, a Wi-Fi mesh network can contain a gateway and a plurality of wireless extenders. The client device can be associated with a 5 GHz BSS and has a low but still acceptable link quality RSSI of, for example, −74 decibel-milliwatts (dBm) which is above a configured poor link quality RSSI trigger value of −75 dBm. Generally, even if the client device is moved or transitioned closer to or within proximity of a different wireless extender that would provide an improve network performance/experience, the client device does not move to a BSS associated with the different wireless extender because client devices tend to stay associated with the current BSS unless experiencing very low RSSI or RCPI and will not be steered by a controller to a BSS on a different network device when the link quality of the associated wireless extender is above a poor RSSI trigger value. Therefore, there is a need to provide steering to optimize performance in a mesh network.

SUMMARY

According to some aspects of the present disclosure there are provided novel solutions for steering a client device within a Wi-Fi mesh network so as to optimize network performance or provide an improved network environment. A steering controller within a network environment, such as a mesh network, can provide steering of one or more client devices associated with a network device (such as an access point device and/or one or more extender access point devices) to a different network device based on data collected from one or more BSS on each non-associated client network devices. For example, the steering controller can collect one or more non-associated client (NAC) link quality parameters from a BSS on a different network device for which utilization and/or other criteria would not prevent steering a client device to the BSS by the steering controller due to one or more blocking conditions. Based on the collected one or more NAC link quality parameters received by the steering controller for a client device, the steering controller can calculate the difference between each possible one or more NAC link quality parameters associated with a target network device for the current BSS and that of each received one or more NAC link quality parameters associated with other candidate BSSs than the current BSS for a client device. This difference can be used by the steering controller to identify or select a candidate BSS for steering a client device, for example, via IEEE (Institute of Electrical and Electronics Engineers) 802.11v BSS transition management soft-steering mechanism.

An aspect of the present disclosure provides an access point device for steering a target client device from a current BSS to a steering BSS. The access point device comprises a memory storing one or more computer-readable instructions and a processor. The processor is configured to execute the one or more computer-readable instructions to obtain one or more non-associated client (NAC) link quality parameters associated with one or more candidate BSSs on one or more network devices, wherein the one or more candidate BSSs are different from the current BSS of the target client device, determine a delta link quality for each of the one or more candidate BSSs based on the one or more NAC link quality parameters and corresponding one or more target link quality parameters associated with the target client device, select, from the one or more candidate BSSs, the steering BSS based on the delta link quality, and send a steering instruction to the target client device, wherein the steering instruction comprises information to steer the client device to the steering BSS.

In an aspect of the present disclosure, the process is further configured to execute the one or more computer-readable instructions to start a NAC collection timer, determine expiration of a NAC collection period based on the NAC collection timer, and wherein the obtaining the one or more NAC link quality parameters is based on the expiration of the NAC collection period.

In an aspect of the present disclosure, the one or more NAC link quality parameters comprise any of a link quality received signal strength indicator NAC data, a link quality received signal received power NAC data, a physical layer rate NAC data, or any combination thereof.

In an aspect of the present disclosure, the selecting the steering BSS based on the delta link quality comprises determining a maximum delta link quality based on the delta link quality determined for each of the one or more candidate BSSs and comparing the maximum delta link quality to an associated link quality trigger threshold.

In an aspect of the present disclosure, wherein the processor is further configured to execute the one or more computer-readable instructions to determine that steering is enabled for the target client device.

In an aspect of the present disclosure, wherein the processor is further configured to execute the one or more computer-readable instructions to compare the one or more target link quality parameters to associated one or more link quality thresholds and wherein obtaining the one or more NAC link quality parameters is based on the comparison.

In an aspect of the present disclosure, obtaining the one or more NAC link quality parameters comprises selecting the one or more network devices based on one or more steering conditions, and wherein NAC link quality parameters are obtained only from the selected one or more network devices.

An aspect of the present disclosure provides a method for steering a target client device from a current BSS to a steering BSS. The method comprises obtaining one or more non-associated client (NAC) link quality parameters associated with one or more candidate BSSs on one or more network devices, wherein the one or more candidate BSSs are different from the current BSS of the target client device, determining a delta link quality for each of the one or more candidate BSSs based on the one or more NAC link quality parameters and corresponding one or more target link quality parameters associated with the target client device, selecting, from the one or more candidate BSSs, the steering BSS based on the delta link quality, and sending a steering instruction to the target client device, wherein the steering instruction comprises information to steer the client device to the steering BSS.

In an aspect of the present disclosure, the method further comprises starting a NAC collection timer, determining expiration of a NAC collection period based on the NAC collection timer, and wherein the obtaining the one or more NAC link quality parameters is based on the expiration of the NAC collection period.

In an aspect of the present disclosure, the method is such that the one or more NAC link quality parameters comprise any of a link quality received signal strength indicator NAC data, a link quality received signal received power NAC data, a physical layer rate NAC data, or any combination thereof.

In an aspect of the present disclosure, the method is such that the selecting the steering BSS based on the delta link quality comprises determining a maximum delta link quality based on the delta link quality determined for each of the one or more candidate BSSs and comparing the maximum delta link quality to an associated link quality trigger threshold.

In an aspect of the present disclosure, the method further comprises determining that steering is enabled for the target client device.

In an aspect of the present disclosure, the method further comprises comparing the one or more target link quality parameters to associated one or more link quality thresholds and wherein obtaining the one or more NAC link quality parameters is based on the comparison.

In an aspect of the present disclosure, the method is such that obtaining the one or more NAC link quality parameters comprises selecting the one or more network devices based on one or more steering conditions and wherein NAC link quality parameters are obtained only from the selected one or more network devices.

An aspect of the present disclosure provides a non-transitory computer-readable medium of an access point device storing one or more computer-readable instructions for steering a target client device from a current BSS to a steering BSS within a network. The one or more computer-readable instructions when executed by a processor of the access point device, cause the access point device to perform one or more operations including one or more of the steps of the methods described above.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples and not for the purpose of limiting the present disclosure as defined by the appended claims and their equivalents. The words and phrases used in the following description and claims are merely used to enable a clear and consistent understanding of the present disclosure. In addition, descriptions of well-known structures, functions, and configurations may be omitted for clarity and conciseness. Those of ordinary skill in the art will recognize that various changes and modifications of the examples described herein can be made without departing from the spirit and scope of the present disclosure.

Figure 1:
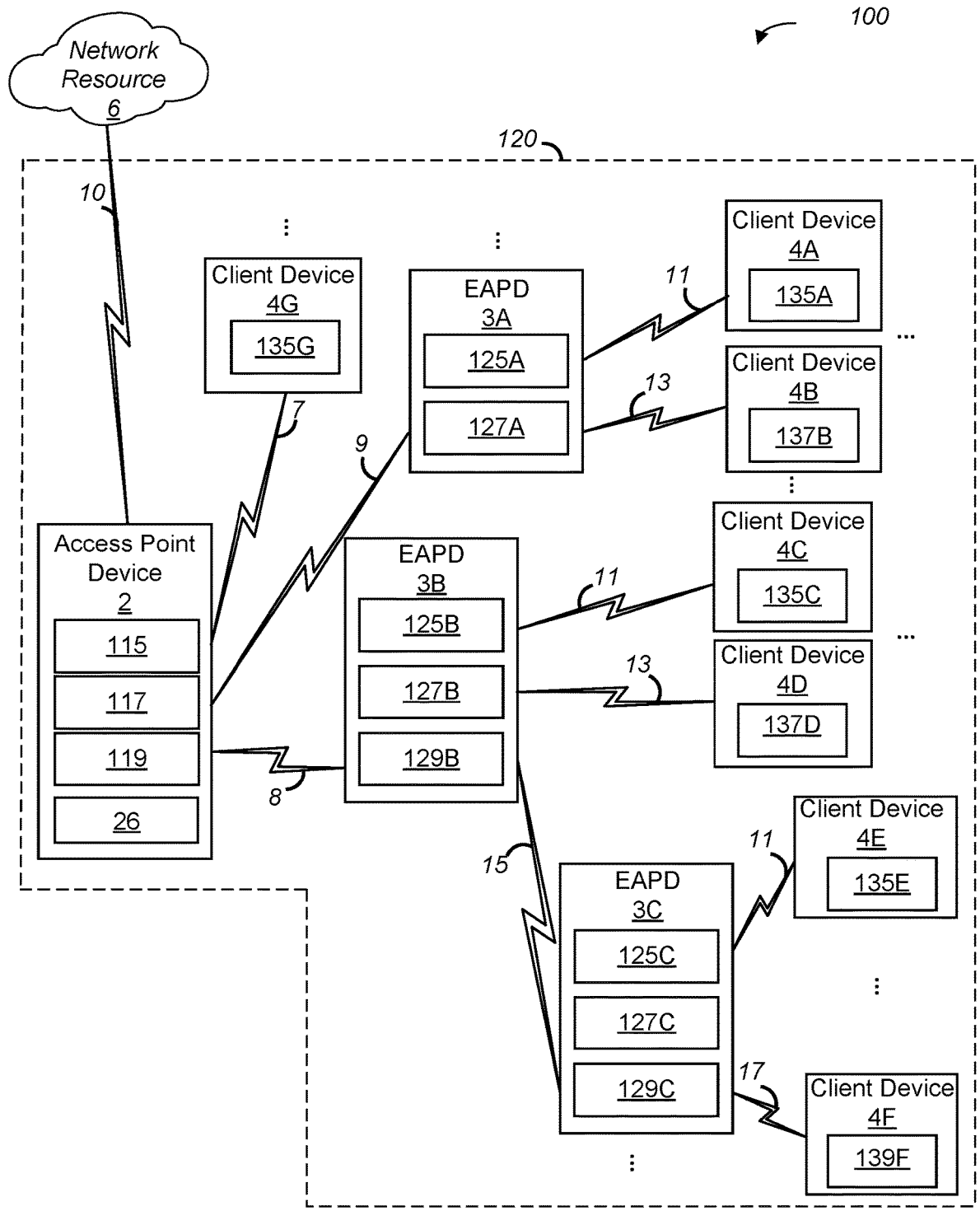
FIG. 1 is a schematic diagram of a steering system of a network environment, according to one or more aspects of the present disclosure.

FIG. 1 is a schematic diagram of a steering system 100 of a network environment 120, according to one or more aspects of the present disclosure. The network environment 120 can comprise a mesh network that utilizes a Wi-Fi network to interconnect one or more network devices or electronic apparatuses.

It should be appreciated that various example embodiments of inventive concepts disclosed herein are not limited to specific numbers or combinations of network devices, and there may be one or multiple of some of the aforementioned network devices in the system, which may itself consist of multiple communication networks and various known or future developed wireless connectivity technologies, protocols, devices, and the like.

As shown in FIG. 1, the steering system 100 includes one or more network devices, such as an access point device (APD) 2 connected to a network resource 6, for example, an Internet Service Provider, the Internet, a repository, a web page, a server, a network service, any other network resource, or any combination thereof, one or more wireless devices (for example, one or more extender access point devices (EAPD) 3 and/or one or more client devices 4) that may be connected in one or more wireless networks (for example, a private network, a guest network, an iControl, a backhaul network, or an Internet of things (IoT) network), any other network devices, or any combination thereof. One or more network devices could be located in more than one network. For example, the wireless extender access point devices 3 could be located both in a private network for providing content and information to a client device 4 and also included in a backhaul network or an iControl network.

The access point device 2 can be, for example, a hardware electronic device that may be a combination modem and network gateway device that combines the functions of a modem, an access point (AP), a gateway, a residential gateway (RG), a broadband access gateway, a home network gateway, a router, a home router, an extender access point device 3, any other network devices that comprises a steering controller 26 (including, but not limited to, a home network controller (HNC)), or any combination thereof. It is also contemplated by the present disclosure that the access point device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The steering controller 26 can provide an optimized network by pushing any one or more client devices 4 to steer to a different BSS so as to obtain improved network performance, such as higher throughput, lower latency, etc. according to one or more aspects of the present disclosure. In addition, costs associated with user complaints can be avoided as the client device can be steered to a BSS on a network device that is closer to the user than the original BSS as opposed to remaining associated with the original BSS on the network device that is further from the client device.

The access point device 2 can include one or more wireless interfaces, including but not limited to, one or more radios such as a 2.4 GHz radio 115, a 5 GHz radio 117, and a 6 GHz radio 119. While FIG. 1 illustrates radios 115, 117, and 119, the present disclosure contemplates any number of radios at any given frequency, such as a 60 GHz radio.

The connections 7, 8 and 9 between the access point device 2 and the one or more extender access point devices 3 and/or one or more client devices 4 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizen broadband radio services (CBRS) band, 2.4 GHz bands, 5 GHz bands, 6 GHz bands, 60 GHz bands, any other bands, or any combination thereof. In one or more embodiments, any of connections 7, 8 and 9 can be a wired connection.

The connections 8 and 9 between the access point device 2 and one or more extender access point devices 3 can be implemented using any radio of the access point device 2 and any radio of the extender access point device 3. For example, the access point device 2 can utilize a radio 117 to establish a connection 9 to a radio 127A of extender access point device 3A and a radio 119 to establish a connection 8 to a radio 129B of extender access point device 3B.

The connections 7, 8, 9, and 10 between the access point device 2, the network resource 6, the one or more extender access point devices 3, and the one or more client devices 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, any one or more connections can be implemented using a wireless connection that operates in accordance with, but is not limited to, RF4CE protocol, ZigBee protocol, Z-Wave protocol, or IEEE 802.15.4 protocol. It is also contemplated by the present disclosure that any one or more connections can include connections to a media over coax (MoCA) network.

The steering system 100 can include one or more extender access point devices 3, for example, extender access point devices 3A, 3B, and 3C. An extender access point device 3 can comprise one or more radios, for example, a 2.4 GHz radio 125 (such as radios 125A, 125B and 125C of extender access point devices 3A, 3B and 3C), a 5 GHz radio 127 (such as radios 127A, 127B, and 127C of extender access point devices 3A, 3B and 3C, respectively), a 6 GHz radio 129 (such as radios 129B and 129C of extender access point devices 3B and 3C, respectively), any other radio, or any combination thereof. The one or more extender access point devices can be, for example, hardware electronic devices such as access points used to extend the wireless network by receiving the signals transmitted by the access point device 2 and rebroadcasting the signals to, for example, one or more client devices 4, which may be out of range of the access point device 2. The one or more extender access point devices 3 can also receive signals from the one or more client devices 4 and rebroadcast the signals to the access point device 2 and/or other client devices 4.

The connections 11, 13 and 15 between respective extender access point devices 3 and one or more client devices 4 is implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of these connections can also be a wired Ethernet connection.

The connection 8 between respective extender access point devices 3 can be implemented using the 6 GHz radio 129 of a wireless extenders 3, for example. The connection 8 enables the wireless extenders 3 to establish a dedicated 6 GHz wireless backhaul (6 GHz BH) according to example embodiments of the present disclosure. For example, a radio 129B of an extender access point device 3B and radio 119 of access point device 2 can be utilized to establish a wireless BH. However, the connection 8 could also be implemented using respective wired interfaces (such as Ethernet, cable, fiber optic, or the like) in some alternative example embodiments.

The steering system 100 can include one or more client devices 4, for example, client devices 4A, 4B, 4C, 4D, 4E, 4F, and 4G. A client device 4 can include a radio such as a 2.4 GHz radio 135 (such as radios 135A, 135C, 135E, and 135G of client devices 4A, 4E and 4G, respectively), a 5 GHz radio 137 (such as radios 137B and 137D of client devices 4B and 4D, respectively), a 6 GHz 139 (such as radio 139F of client device 4F), any other radio, or any combination thereof. The client devices 4 can be, for example, hand-held computing devices, personal computers, electronic tablets, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the access point device 2. Additionally, the client devices 4 can be a television (TV), an IP/QAM set-top box (STB) or a streaming media decoder (SMD) that is capable of decoding audio/video content, and playing over OTT or MSO provided content received through the access point device 2.

The connection 7 between the access point device 2 and the client device 4 can be implemented through a wireless connection that operates in accordance with, but is not limited to, any IEEE 802.11 protocols. Additionally, the connection 7 between the gateway device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G, etc. network, for example. The connection 7 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of the connections 10 can also be a wired Ethernet connection.

The connection 7 between the client device 4G and the access point device 2 can be implemented using the 2.4 GHz radio 135G of the client device 4G and the 2.4 GHz radio 115 of the access point device 2, for example. The connection 7 enables the access point device 2 and the client device 4 to establish a 2.4 GHz wireless fronthaul (6 GHz FH) according to example embodiments of the present disclosure. However, the connection 7 could also be implemented using respective wired interfaces (such as Ethernet, cable, fiber optic, or the like) in some alternative example embodiments.

The connections 11, 13, 15, and 17 between one or more extender access point devices 3 and one or more other extender access point devices 3 or one or more client devices 4 is implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, any of these connection can be implemented using a wireless connection that operates in accordance with, but is not limited to, RF4CE protocol, ZigBee protocol, Z-Wave protocol, or IEEE 802.15.4 protocol. Also, one or more of the connections 11, 13, 15, and 17 can be a wired Ethernet connection.

Figure 2:
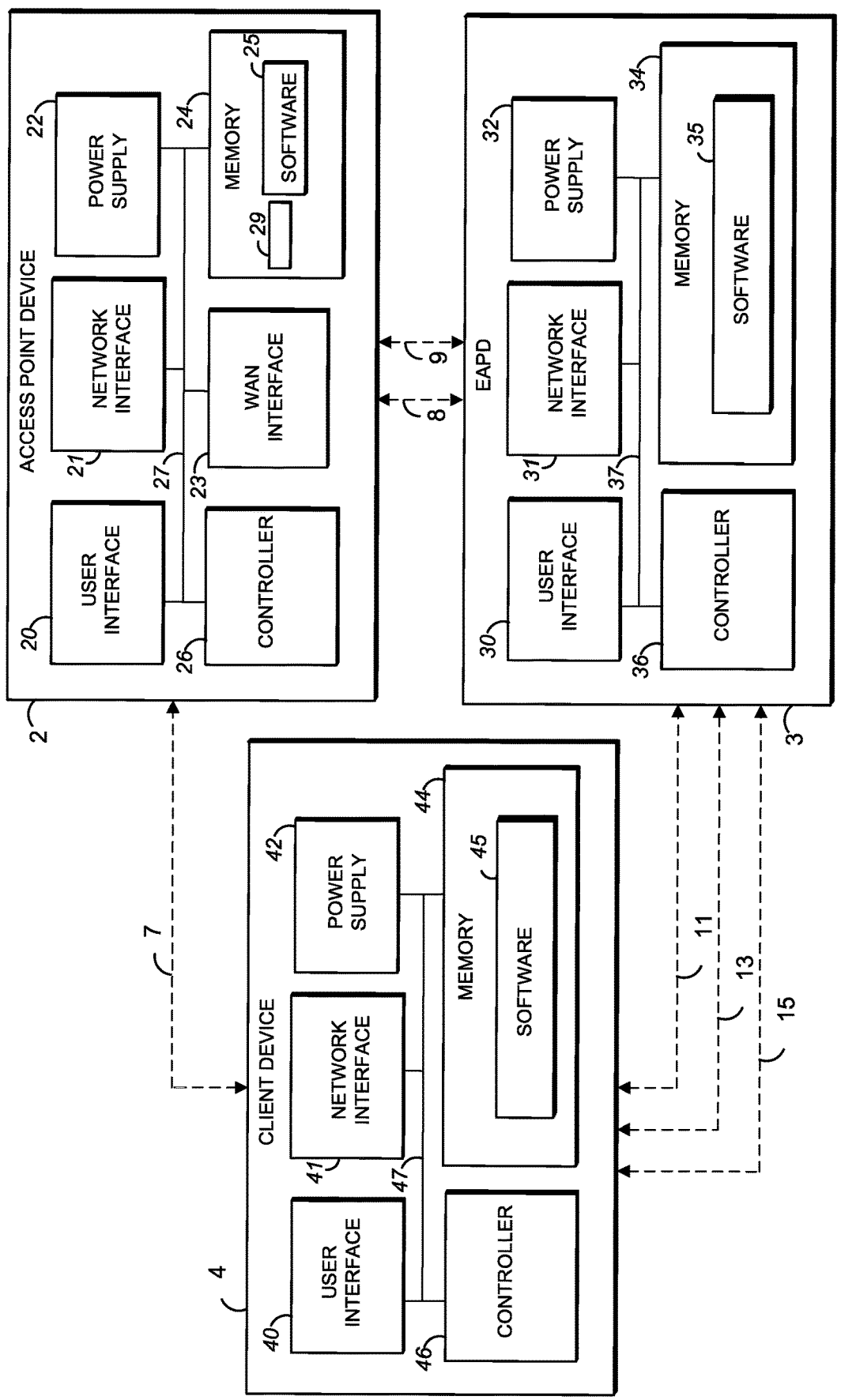
FIG. 2 is a more detailed block diagram illustrating various components of a network environment of FIG. 1, according to one or more aspects of the present disclosure.

A more detailed description of the exemplary internal components of the gateway device 2, the wireless extenders 3, and the client devices 4 shown in FIG. 1 will be provided in the discussion of FIG. 2. However, in general, it is contemplated by the present disclosure that the access point device 2, the extender access point device 3, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the access point device 2, the extender access point devices 3, and the client devices 4, may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other computing devices over the one or more network connections to local and wide area networks, wireless and wired networks, public and private networks, and any other communication network enabling communication in the system.

FIG. 2 is a more detailed block diagram illustrating various components of a network environment, according to one or more aspects of the present disclosure.

Although FIG. 2 only shows one extender access point device 3 and one client device 4, the extender access point device 3 and the client device 4 shown in the figure are meant to be representative of the other extender access point device 3 and client devices 4 shown in FIG. 1. Similarly, the connections 8, 9, 10, and 11 between the gateway device 2, the wireless extender 3, and the client device 4 shown in FIG. 2 are meant to be exemplary connections and are not meant to indicate all possible connections between the gateway devices 2, extender access point devices 3, and client devices 4. Additionally, it is contemplated by the present disclosure that the number of access point devices 2, extender access point devices 3, and client devices 4 is not limited to the number of access point devices 2, extender access point devices 3, and client devices 4 shown in FIGS. 1 and 2.

Now referring to FIG. 2 (for example, from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the access point device 2. Additionally, the client device 4 can be a TV, an IP/QAM STB, or an SMD that is capable of decoding audio/video content, and playing over OTT or MSO provided content received through the access point device 2.

As shown in FIG. 2, the client device 4 includes a user interface 40, a network interface 41, a power supply 42, a memory 44, and a local controller 46. The user interface 40 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities to allow interaction between a user and the client device 4. The network interface 41 can include, but is not limited to, various network cards, interfaces, and circuitry implemented in software and/or hardware to enable communications with the access point device 2 and the extender access point device 3 using the communication protocols in accordance with connections 7, 11, 13, and 15 (for example, as described with reference to FIG. 1). The network interface 41 can include multiple radios (for example, a 2.4 GHz radio, a 5 GHz radio, a 6 GHz radio, a 60 GHz radio, any other radio, or any combination thereof), which may also be referred to as wireless local area network (WLAN) interfaces. Any one or more of the radios can provide a fronthaul (FH) connection between the client device(s) 4 and the access point device 2 and/or the extender access point device 3.

The power supply 42 supplies power to the internal components of the client device 4 through the internal bus 47. The power supply 42 can be a self-contained power source such as a battery pack with an interface to be powered through an electrical charger connected to an outlet (for example, either directly or by way of another device). The power supply 42 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The memory 44 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 44 can be used to store any type of instructions, software, or algorithms including software 45 for controlling the general function and operations of the client device 4 in accordance with the embodiments described in the present disclosure.

The local controller 46 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 45 for controlling the operation and functions of the client device 4 in accordance with the embodiments described in the present disclosure. Communication between the components (for example, 40, 41, 42, 44, 46) of the client device 4 may be established using an internal bus 47.

The extender access point device 3 can be, for example, a hardware electronic device such as an access point used to extend a wireless network by receiving the signals transmitted by the access point device 2 and rebroadcasting the signals to client devices 4, which may be out of range of the access point device 2. The extender access point device 3 can also receive signals from the client devices 4 and rebroadcast the signals to the gateway device 2, mobile device 5, or other client devices 4.

As shown in FIG. 2, the extender access point device 3 includes a user interface 30, a network interface 31, a power supply 32, a memory 34, and a local controller 36. The user interface 30 can include, but is not limited to, push buttons, a keyboard, a keypad, an LCD, a TFT, an LED, an HD or other similar display device including a display device having touch screen capabilities so as to allow interaction between a user and the wireless extender 3. The network interface 31 can include various network cards, interfaces, and circuitry implemented in software and/or hardware to enable communications with the client device 4 and the access point device 2 using the communication protocols in accordance with connections 8, 9, 11, 12 and/or 13 (for example, as described with reference to FIG. 1). For example, the network interface 31 can include multiple radios or sets of radios (for example, a 2.4 GHz radio, a 5 GHz radio, a 6 GHz radio, a 60 GHz radio, any other radio, or any combination thereof), which may also be referred to as wireless local area network (WLAN) interfaces. One radio or set of radios provides a backhaul (BH) connection between the extender access point device 3 and the access point device 2, and optionally other extender access point device(s) 3. Another radio or set of radios provides a fronthaul (FH) connection between the extender access point device 3 and one or more client device(s) 4.

The power supply 32 supplies power to the internal components of the wireless extender 3 through the internal bus 37. The power supply 32 can be connected to an electrical outlet (for example, either directly or by way of another device) via a cable or wire. The memory 34 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 34 can be used to store any type of instructions, software, or algorithm including software 35 associated with controlling the general functions and operations of the extender access point device 3 in accordance with the embodiments described in the present disclosure.

The local controller 36 controls the general operations of the extender access point device 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software including the software 35 for controlling the operation and functions of the extender access point device 3 in accordance with the embodiments described in the present disclosure. General communication between the components (for example, 30, 31, 32, 34, 36) of the extender access point device 3 may be established using the internal bus 37.

The access point device 2 can be, for example, a hardware electronic device that can combine the functions of a modem, an access point (AP), and/or a router for providing content received from the content provider (ISP) 1 to network devices (for example, extender access point device 3, client devices 4) in the system. It is also contemplated by the present disclosure that the access point device 2 can include the function of, but is not limited to, an IP/QAM STB or SMD that is capable of decoding audio/video content, and playing OTT or MSO provided content.

As shown in FIG. 2, the access point device 2 includes a user interface 20, a network interface 21, a power supply 22, a wide area network (WAN) interface 23, a memory 24, and a steering controller 26. The user interface 20 can include, but is not limited to, push buttons, a keyboard, a keypad, an LCD, a TFT, an LED, an HD or other similar display device including a display device having touch screen capabilities so as to allow interaction between a user and the gateway device 2. The network interface 21 may include various network cards, and circuitry implemented in software and/or hardware to enable communications with the extender access point device 3 and the client device 4 using the communication protocols in accordance with connections 7, 8, 9, 11, 13, and/or 15 (for example, as described with reference to FIG. 1). For example, the network interface 21 can include an Ethernet port (also referred to as a LAN interface) and multiple radios or sets of radios (for example, a 2.4 GHz radio, a 5 GHz radio, a 6 GHz radio, a 60 GHz radio, any other radio or any combination thereof also referred to as WLAN interfaces). One radio or set of radios can provide a wireless backhaul (BH) connection between the access point device 2 and the extender access point device(s) 3. Another radio or set of radios can provide a fronthaul (FH) connection between the access point device 2 and one or more client device(s) 4.

The power supply 22 supplies power to the internal components of the access point device 2 through the internal bus 27. The power supply 22 can be connected to an electrical outlet (for example, either directly or by way of another device) via a cable or wire. The WAN interface 23 may include various network cards, and circuitry implemented in software and/or hardware to enable communications between the access point device 2 and the network resource 6 using the wired and/or wireless protocols in accordance with connection 10 (for example, as described with reference to FIG. 1). For example, the WAN interface 23 can include an Ethernet port and one or more radios (for example, a 6 GHz radio). The WAN interface 23 (for example, a 6 GHz radio) may be used to provide a wireless backhaul (BH) connection between the access point device 2 and any one or more other elements, according to example embodiments of the present disclosure. However, the WAN interface 23 could provide a wired Ethernet connection (for example, a BH connection) between the access point device 2 and any other element according to some alternative example embodiments.

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the access point device 2 and performing management functions related to the other devices (for example, extender access point devices 3 and client devices 4) in the network in accordance with the embodiments described in the present disclosure. The memory 24 can store a link quality threshold associated with one or more link quality parameters (for example, an RSSI threshold, an RCPI threshold, a PHY rate threshold, any other link quality threshold, or any combination thereof), one or more link quality trigger thresholds associated with one or more link quality parameters (for example, a link quality RSSI trigger threshold, a link quality RCPI trigger threshold, a PHY rate threshold, any other trigger threshold, or any combination thereof), or both, and BSS utilization data (also required for a steering decision). The one or more link quality parameters can correspond to a target client device 4 (one or more target link quality parameters) and/or one or more NAC BSSs on one or more network devices (one or more NAC link quality parameters). The one or more target link quality parameters can comprise any of a power data (such as link quality RSSI data, link quality RCPI data, etc.), a PHY rate data, any other link quality data, or any combination thereof that are received from the client device 4 for the currently associated BSS on the current network device. The one or more NAC link quality parameters can comprise any of NAC data such as any of power NAC data (such as a link quality RSSI NAC data, a link quality RCPI NAC data, etc., a BSS utilization data, any other link quality NAC data, or any combination thereof. The steering controller 26 can use the link quality threshold for comparison with a received or measured link quality parameter and the link quality trigger threshold for comparison with a difference between a link quality parameter associated with a BSS of a selected client device 4 (or a target client device 4 for steering) and a corresponding link quality parameter associated with a candidate BSS, not associated with the client device 4, of a network device other than the client device 4.

The steering controller 26 controls the general operations of the access point device 2 as well as performs management functions related to the other devices (for example, extender access point device 3 and client device 4) in the network. The steering controller 26 may also be referred to as a HNC. The steering controller 26 can include, but is not limited to, a central processing unit (CPU), a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the access point device 2 in accordance with the embodiments described in the present disclosure. Communication between the components (for example, 20, 21, 22, 23, 24, 26) of the access point device 2 may be established using the internal bus 27. The steering controller 26 may also be referred to as a processor, generally.

Figure 3:
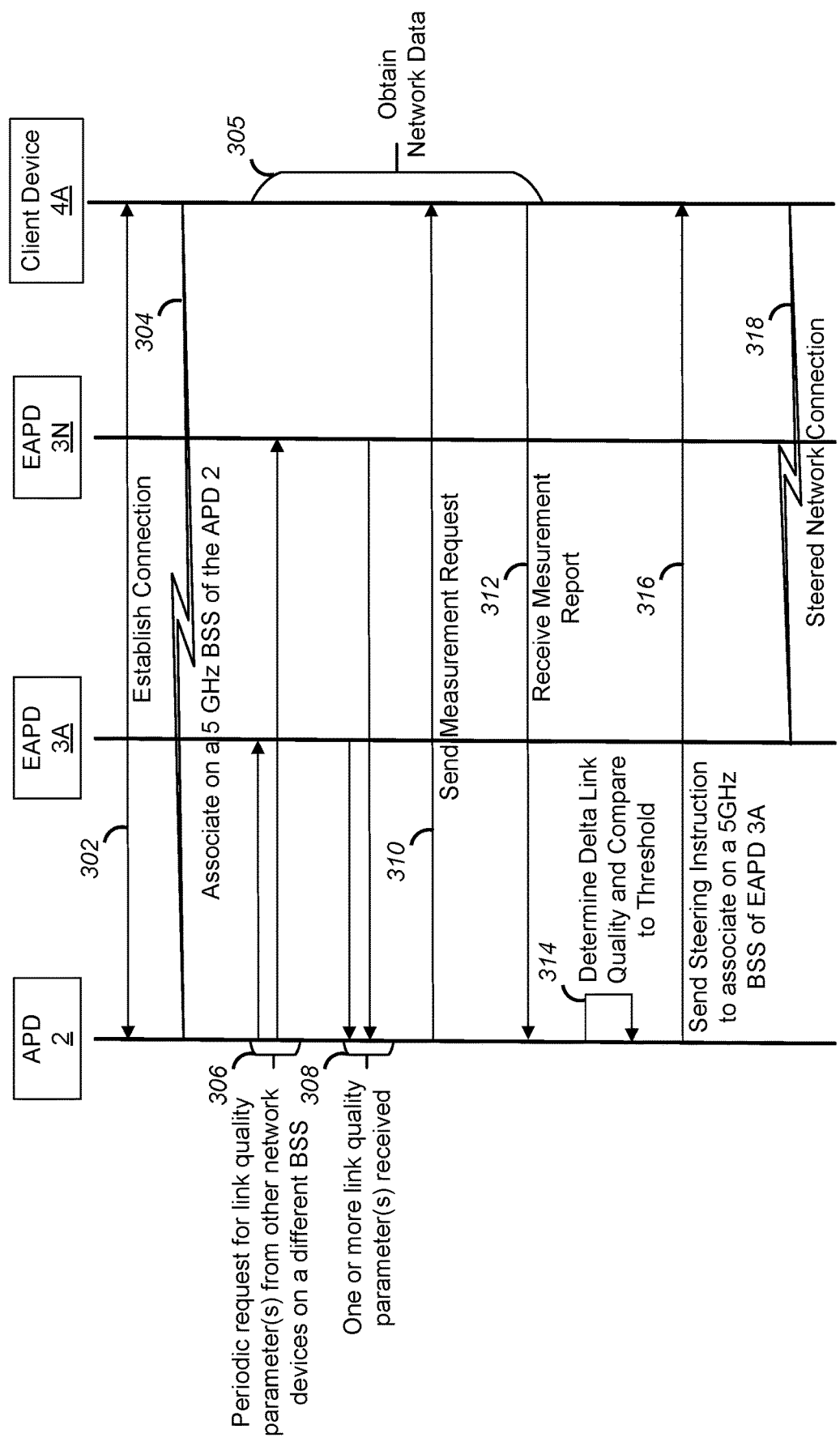
FIG. 3 is a diagram illustrating steering of a client device to optimize network performance within the mesh network, according to one or more aspects of the present disclosure.

FIG. 3 is a diagram illustrating steering of a client device 4A to optimize network performance within the mesh network 120, according to one or more aspects of the present disclosure. As an example, when a client device 4A comes within proximity of a network, for example, a mesh network 120, the client device 4A at 302 establishes a connection with an access point device 2. In this example, a steering controller 26 of access point device 2 associates the client device 4A at 304 with a 5 GHz BSS on the access point device 2 (the original or current BSS) instead of other network devices within the mesh network 120, for example, extender access point devices 3A and 3N (where N represents any number of extender access point devices 3), any other network devices, or any combination thereof. As an example, the original BSS associated with the network connection between the client device 4A (also referred to as the target client device) and the access point device 2 can have a link quality RSSI data of −74 dBm. A link quality RSSI trigger threshold can be set for the mesh network 120, for example, at −75 dBm. The steering controller 26 can determine that the link quality RSSI data associated with the 5 GHz BSS on the access point device 2 is adequate based on a comparison to the link quality RSSI trigger threshold. Typically, the client device 4A is not steered to another or candidate BSS as the original or current BSS is adequate. However, another or candidate BSS may provide an improved network experience and/or performance for the client device 4A and thus not attempting to steer the client device 4A results in non-optimized network performance.

To improve or optimize the network experience and/or network performance for the client device 4A, the steering controller 26 at 305 obtains network data, for example, one or more NAC link quality parameters from one or more network devices associated with the mesh network 120. For example, at 306, the steering controller 26 can periodically request, query, or otherwise poll for one or more link quality parameters (one or more NAC link quality parameters) associated with a different or candidate BSS than the original BSS on a different network device. The steering controller 26 can request one or more NAC link quality parameters from extender access point devices 3A and 3N that are associated with a different or candidate BSS than the BSS of the target client device 4A. In one or more embodiments, a target client device and/or one or more network devices can be identified or selected based on one or more steering conditions. The one or more steering conditions can comprise a steering indicator that indicates whether steering would be permitted or allowed for the client device and/or network device based on any known data or information, for example, recent steer limitation or traffic limitation, a polling period (for example, the request can be conducted or initiated at every $n^{th}$ polling period, where n represent any value for a client device 4 (also referred to as a station (STA)) on a BSS that is able to steer (for example, not blocked from prior steering delay restrictions and traffic level restrictions), a network utilization or other network data, for example, that is within a range or at and/or below a threshold, NAC data indicator that indicates whether the network device (extender access point device 3A and/or 3N) is configured or able to provide one or more NAC data (one or more NAC link quality parameters), a current steering condition (such as number of steer attempts, timing of steer attempts, etc.), any other steering condition, or any combination thereof. By only attempting to steer a target client device to the one or more NAC network devices based on one or more steering conditions any one or more network resources can be conserved as network information is not requested, obtained, or otherwise received for any client device and/or network device that does not meet a required or specified steering condition.

At 308, the steering controller 26 can receive the requested one or more NAC link quality parameters from the extender access point devices 3A and 3N. For example, the steering controller 26 can receive the link quality parameter RSSI NAC data indicated in TABLE 1. If any one or more NAC data (such as one or more NAC link quality parameters) are not received at 308, then the steering controller 26 of the access point device 2 can additionally, at 310, send a measurement request to client device 4A (an IEEE 802.11K client device) as needed to collect or obtain these missing one or more NAC link quality parameters for one or more BSSs on any one or more network devices (such as any one or more extender access point devices 3 or an access point device 2), here, for example, extender access point devices 3A and/or 3N. For example, if any of the one or more NAC link quality parameters associated with the client device 4A are not successfully acquired directly from the one or more network devices (for example, extender access point devices 3A and 3N) then the steering controller 26 can request such one or more NAC link quality parameters using a measurement request to the client device 4A. The measurement request at 310 can be any type of request that obtains one or more NAC link quality parameters (referred to as the one or more target link quality parameters), for example, the measurement request can comprise a beacon report request (for RCPI data), a frame report request, a channel load report request, a noise histogram report request, a hidden node report request, a medium sensing time histogram report request, a station statistics report request, a location configuration information request, any other measurement request (such as provided by IEEE 802.11k, IEEE 802.11v, any other IEEE 802.11 standard, or any combination thereof), or any combination thereof.

At 312, the steering controller can receive the requested measurement request report (such as a beacon report or any other report that includes one or more NAC link quality parameters) from the client device 4A, for example, that includes the data in TABLE 1. In this way, if one or more NAC link quality parameters are not directly obtainable for a candidate BSS on a network device from the one or more selected or identified network devices, the steering controller 26 can attempt to obtain the one or more NAC link quality parameters from the client device (the target client device).

TABLE 1

| $BSS_j$ | Network Device/Candidate BSS | Link Quality Parameter (RSSI NAC) |
|---|---|---|
| 1 | EAPD 3A 5 GHz BSS | −50 dBm |
| 2 | EAPD 3A 2.4 GHz BSS | −52 dBm |
| 3 | EAPD 3N 5 GHz BSS | −65 dBm |

At step 314, the steering controller 26 determines a delta link quality for each target client device (for example, client device 4A) based on any received one or more target link quality parameters and any received or obtained one or more NAC link quality parameters associated with each of the candidate BSS on one or more selected or identified network devices (for example, extender access point device 3A, extender access point device 3N, any other NAC network device, or any combination thereof), where the received or obtained one or more NAC link quality parameters can be from a selected or identified network device or included within a measurement report. The delta link quality (ΔLQ) can be determined, for example, by EQUATION 1:

$$\Delta LQ_{(i, NACj)} = TLQP_i - NACLQP_{NACj} \qquad \text{EQUATION 1,}$$

where TLQP indicates a target link quality parameter, for example, RSSI or RCPI, of the target client device for the current BSS (for example, a target link quality parameter for the client device 4A on BSS of the access point device 2), NACLQP indicates a NAC link quality parameter for a candidate BSS of a network device that is different than the current BSS of the target client device where the target link quality parameter corresponds to a NAC link quality parameter (such as RSSI), i indicates the target client device to be steered (for example, client device 4A), and NACj indicates any other network device associated with a candidate BSSj (for example, any of the $BSS_{1-3}$ in Table 1) for which one or more NAC link quality parameters were received but not associated with the current or original BSS, for example, RSSI NAC data and/or RCPI NAC data (for example, the link quality parameters of EQUATION 1 can be a target link quality RSSI ($TLQP_i$) and a link quality NAC RSSI data ($NACLQP_{NACj}$). Each TLQP corresponds to a NACLQP, for example, a target RSSI and/or RCPI link quality parameter of a target client device 4A and a NAC RSSI and/or RCPI link quality parameter of a candidate BSS on a NAC network device can be used to determine a delta link quality of EQUATION 1. The largest or maximum ΔLQ (MAX) is determined or identified, for example, by EQUATION 2:

$$MAX_{i,j} = \max(\Delta LQ_{(i, NACj)}) \quad \text{EQUATION 2.}$$

The steering controller 26 can compare the maximum delta link quality of the determined one or more delta link qualities to a link quality trigger threshold. Each link quality parameter can have an associated link quality trigger threshold such that the maximum delta link quality based on a particular link quality parameter is compared to an associated link quality trigger threshold. The comparison can indicate that the maximum delta link quality meets a link quality threshold, for example, is less than, equal to, or both, to the link quality trigger threshold, for example, as indicated in EQUATION 3 or EQUATION 4:

$$MAX_{i,j} \leq LQThresh_q \quad \text{EQUATION 3, or}$$

$$MAX_{i,j} \geq LQThresh_q \quad \text{EQUATION 4,}$$

where $LQThresh_q$ indicates the link quality trigger threshold for a link quality parameter q.

For example, the link quality trigger threshold can be identified as or configured to be 15 dBm such that a client device 4A with an RSSI of −65 dBm BSS association can still be triggered for a steer if a candidate BSS on a NAC network device has a NAC RSSI of −50 dBm or better. The steering controller 26 can at 316 attempt to steer a target client device i (here client device 4A) to the candidate BSS NACj (here extender access point device 3A) by sending one or more steering instructions to the target client device 4A. The one or more steering instructions can be via IEEE 802.11v (BSS transition management standard) soft-steering requirements. The one or more steering instructions allow the target client device 4A to decide whether to move to the BSS that will provide improved network environment and/or network performance, for example, improved RSSI. At 318, the target client device 4A completes the steer to the extender access point device 3A based on the one or more steering instructions.

While FIG. 3 illustrates a single client device 4A, the present disclosure contemplates that the steering controller 26 can process, analyze, or otherwise attempt to steer as discussed with respect to 302-318 any one or more client devices 4 concurrently, in parallel, substantially simultaneously, sequentially, or any combination thereof. Further, any one or more steps or operations discussed with reference to FIG. 3 can be performed in parallel or complimentary to any one or more existing steering technologies, such as reactive link quality steering in which a low RSSI link quality parameter for an associated client device 4 triggers an attempt to steer the client device 4 to a different BSS.

Figure 4:
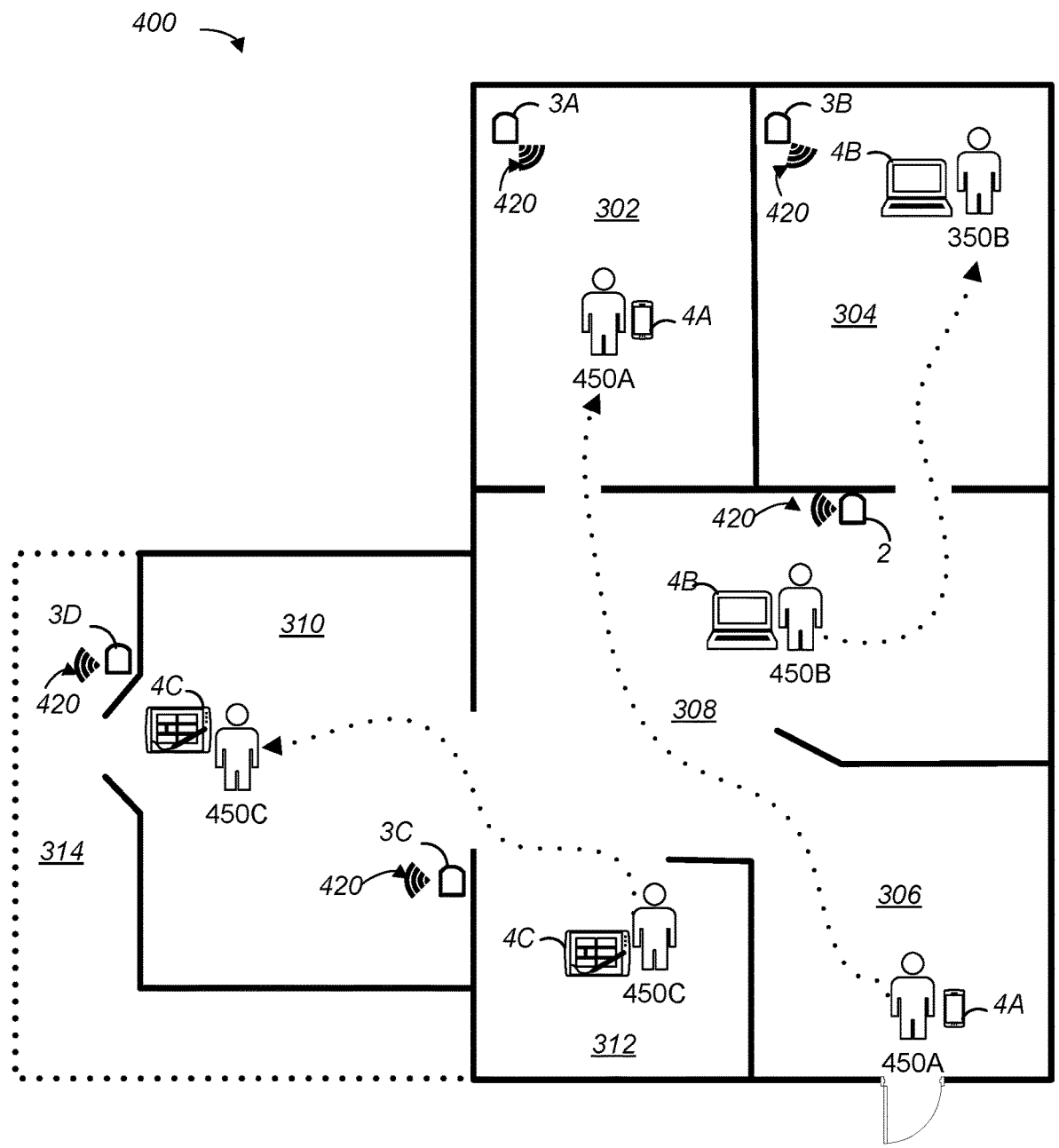
FIG. 4 is a diagram illustrating steering various client devices within a mesh network to optimize network performance, according to one or more aspects of the present disclosure.

FIG. 4 is a diagram illustrating a network environment 400 for steering various target client devices 4 within a mesh network 420 to optimize network performance, according to one or more aspects of the present disclosure. Mesh network 420 can be similar to or the same as mesh network 120 discussed with reference to FIG. 1. The mesh network 400 can comprise one or more users 450, such as users 450A, 450B and 450C and one or more network devices, such as target client devices 4A, 4B, and 4C associated with users 450A, 450B, and 450C, respectively, extender access point devices 3A, 3B, 3C and 3D disposed or positioned at locations 302, 304, 310 and 314, and access point device 2 disposed or positioned at location 308. The access point device 2 can comprise a steering controller 26 that can attempt to steer any one or more target client devices 4 to another BSS based on a determined delta link quality that utilizes one or more link quality parameters.

A user 450A can enter a network environment 400 at a location 306, for example, a foyer or entrance, with a target client device 4A, for example, a cellular telephone. The target client device 4A is within proximity of the access point device 2 and establishes a network connection to the mesh network 420 via the access point device 2. The target client device 4A associates with a first BSS on the access point device 2. The user 450A transitions with the target client device 4A from the location 306 to a location 302, for example, a bedroom or business center, that comprises an extender access point device 3A and a second BSS on the extender access point device 3A where the second BSS is different than the first BSS.

A user 450B can be disposed or positioned at a network environment 400 at a location 308, for example, a living room or common space, with a target client device 4B, for example, a laptop or portable computer. The target client device 4B is within proximity of the access point device 2 and establishes a network connection to the mesh network 420 via the access point device 2. The target client device 4B associates with the first BSS on the access point device 2. The user 450B transitions with the target client device 4B from the location 308 to a location 304, for example, an office, that comprises an extender access point device 3B and a third BSS on the extender access point device 3B where the third BSS is different than the first BSS and the second BSS.

A user 450C can be disposed or positioned at a network environment 400 at a location 312, for example, a kitchen or breakroom, with a target client device 4C, for example, a tablet computer or other handheld computing device. The target client device 4C is within proximity of the extender access point device 3C and establishes a network connection to the mesh network 420 via the extender access point device 3C. The target client device 4C associates with a fourth BSS on the extender access point device 3C where the fourth BSS is different than the first BSS, the second BSS, and the third BSS. The user 450C transitions with the target client device 4C from the location 312 to a location 310, for example, a media room or a conference room, that comprises the extender access point device 3C and is within proximity to a location 314, for example, a patio, that comprises an extender access point device 3D and a fifth BSS on the extender access point device 3D where the fifth BSS is different than the first BSS, the second BSS, the third BSS, and the fourth BSS.

Typically, as the link quality parameter for each client device 4 meets or satisfies the link quality threshold (for example, is below the link quality threshold of −75 dBm), no steering would be attempted even as the client devices 4 are transitioned throughout the network environment 400 even though the client device 4 could have an improved network experience or network performance by steering to a different network device associated with a candidate BSS. To provide an improve network experience or network performance, the steering controller 26 can attempt to steer each of the target client devices 4A, 4B and 4C as the devices are transitioned throughout the network environment 400. For example, the target client devices 4A, 4B, and 4C can be associated with an original BSS with an RSSI as the link quality parameter as indicated in TABLE 2. The steering controller 26 can be configured or otherwise have stored a link quality trigger threshold (for example, a link quality RSSI trigger value) of 15 dBm. The steering controller 26 can attempt to steer the target client devices 4A, 4B and 4C based on the delta link quality and the link quality trigger threshold, for example, as indicated in TABLE 3A (steering for target client device 4A), TABLE 3B (steering for target client device 4B), and TABLE 3C (steering for target client device 4C).

TABLE 2

| Network Device | BSS | Link Quality Parameter (RSSI) |
|---|---|---|
| Client Device 4A | APD 2 5 GHz BSS | −74 dBm |
| Client Device 4B | APD 2 5 GHz BSS | −74 dBm |
| Client Device 4C | EAPD 3C | −68 dBm |

TABLE 3A

Delta Link Quality ($\Delta LQ_{(Client\ Device\ 4A,\ j)}$)
(dBm)

$\Delta LQ_{(Client\ Device\ 4A,\ EAPD\ 3A\ (5\ GHz))} = -74 - (-55) = -19$
$\Delta LQ_{(Client\ Device\ 4A,\ EAPD\ 3A\ (2.4\ GHz))} = -74 - (-68) = -6$
$\Delta LQ_{(Client\ Device\ 4A,\ EAPD\ 3B\ (6\ GHz))} = -74 - (-65) = -9$
$\Delta LQ_{(Client\ Device\ 4A,\ EAPD\ 3C\ (5\ GHz))} = -74 - (-70) = -4$
$\Delta LQ_{(Client\ Device\ 4A,\ EAPD\ 3D\ (5\ GHz))} = -74 - (-75) = 1$
MAX = max ($\Delta LQ_{(Client\ Device\ 4A,\ NACj)}$)   −19 dBm

TABLE 3B

Delta Link Quality ($\Delta LQ_{(Client\ Device\ 4B,\ j)}$)
(dBm)

$\Delta LQ_{(Client\ Device\ 4B,\ EAPD\ 3A\ (5\ GHz))} = -74 - (-60) = -14$
$\Delta LQ_{(Client\ Device\ 4B,\ EAPD\ 3A\ (2.4\ GHz))} = -74 - (-74) = -0$
$\Delta LQ_{(Client\ Device\ 4B,\ EAPD\ 3B\ (6\ GHz))} = -74 - (-55) = -19$
$\Delta LQ_{(Client\ Device\ 4B,\ EAPD\ 3C\ (5\ GHz))} = -74 - (-60) = -4$
$\Delta LQ_{(Client\ Device\ 4B,\ EAPD\ 3D\ (5\ GHz))} = -74 - (-75) = 1$
MAX = max ($\Delta LQ_{(Client\ Device\ 4B,\ NACj)}$)   −19 dBm

TABLE 3C

Delta Link Quality ($\Delta LQ$ (Client Device 4A, j))
(dBm)

$\Delta LQ_{(Client\ Device\ 4C,\ EAPD\ 3A\ (5\ GHz))} = -68 - (-55) = -13$
$\Delta LQ_{(Client\ Device\ 4C,\ EAPD\ 3A\ (2.4\ GHz))} = -68 - (-68) = 0$
$\Delta LQ_{(Client\ Device\ 4C,\ EAPD\ 3B\ (6\ GHz))} = -68 - (-55) = -13$
$\Delta LQ_{(Client\ Device\ 4C,\ APD\ 2\ (5\ GHz))} = -68 - (-60) = -8$
$\Delta LQ_{(Client\ Device\ 4C,\ EAPD\ 3D\ (5\ GHz))} = -68 - (-50) = -18$
MAX = max ($\Delta LQ_{(Client\ Device\ 4C,\ NACj)}$)   −18 dBm With respect to target client device 4A, after transitioning to location 302, the steering controller 26 can perform one or more operations, for example, as discussed with reference to FIG. 3, and determine one or more delta link qualities for one or more candidate BSSs, such as indicated in TABLE 3A. Based on the delta link qualities of TABLE 3A, the steering controller 26 can attempt to steer the target client device 4A to a 5 GHz BSS on the extender access point device 3A that has the maximum delta link quality. With respect to target client device 4B, after transitioning to location 304, the steering controller 26 can perform one or more operations, for example, as discussed with reference to FIG. 3, and determine one or more delta link qualities for one or more candidate BSSs, such as indicated in TABLE 3B. Based on the delta link qualities of TABLE 3B, the steering controller 26 can attempt to steer the target client device 4B to a 6 GHz BSS on the extender access point device 3B that has the maximum delta link quality. With respect to target client device 4C, after transitioning to location 310, the steering controller 26 can perform one or more operations, for example, as discussed with reference to FIG. 3, and determine one or more delta link qualities for one or more candidate BSSs, such as indicated in TABLE 3C. Based on the delta link qualities of TABLE 3C, the steering controller 26 can attempt to steer the target client device 4C to a 5 GHz BSS on the extender access point device 3D that has the maximum delta link quality. In one or more embodiments, the steering controller 26 attempts to steer the target client device 4 to a candidate BSS only when a MAX or an |MAX| is at or above a max threshold, such as −15 dBm or |−15 dBm| or above, so as to maximize the improved network performance while minimizing any disruption.

The present disclosure contemplates any one or more steps or operations discussed with reference to FIG. 4 can be performed, for example, the steering controller 26 can process, analyze, or otherwise attempt to steer any one or more client devices 4, concurrently, in parallel, substantially simultaneously, sequentially, or any combination thereof. Further, any one or more steps or operations discussed with reference to FIG. 4 can be performed in parallel or complimentary to any one or more existing steering technologies, such as reactive link quality steering in which a low RSSI link quality parameter for an associated client device 4 triggers an attempt to steer the client device 4 to a different BSS.

Figure 5:
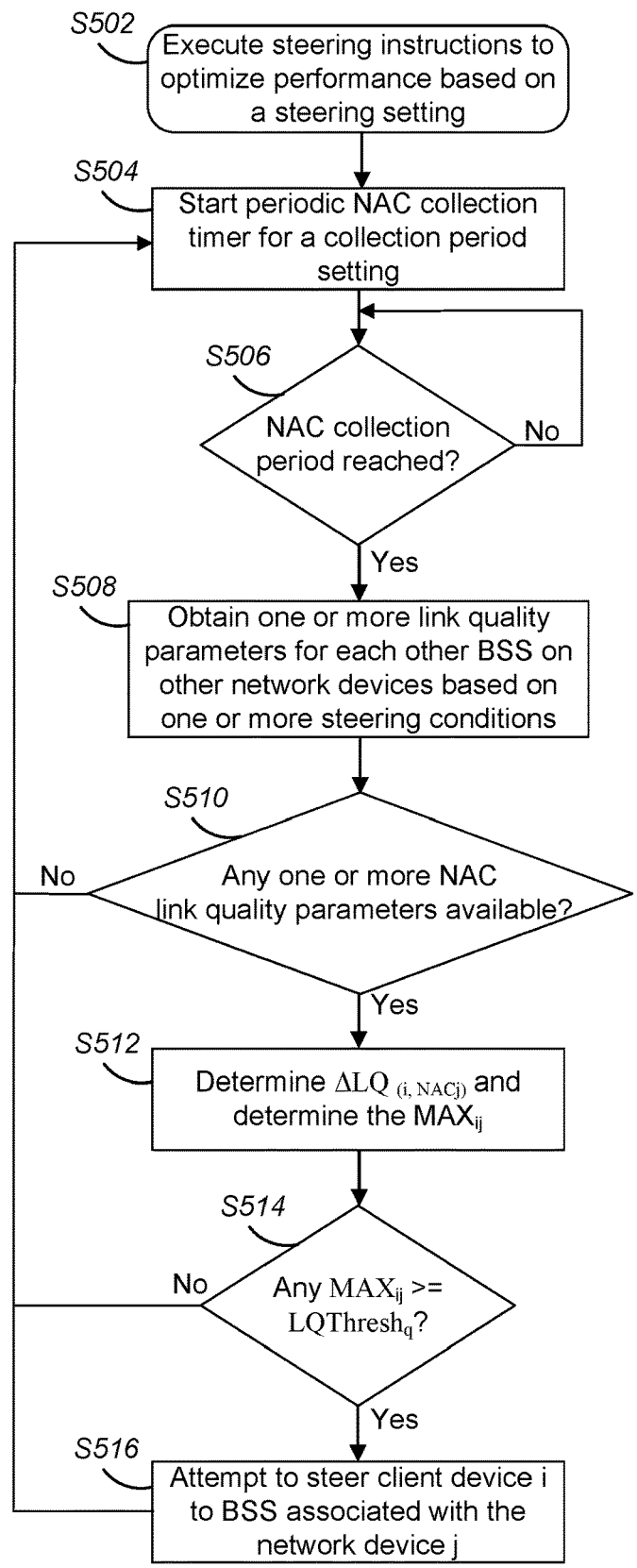
FIG. 5 is a flowchart illustrating a method for steering a client device in a network environment to optimize network performance, according to one or more aspects of the present disclosure.

FIG. 5 is a flowchart illustrating a method for steering a target client device 4 in a network environment to optimize network performance, according to one or more aspects of the present disclosure. The network environment can comprise a mesh network that includes a plurality of network devices, such as an access point 2 and one or more extender access point devices 3, a plurality of extender access point devices 3, or any combination of network devices. At step S502, the steering controller 26, for example, of an access point device 2 in the network environment, executes one or more computer-readable instructions for steering one or more client devices 4 to optimize network performance when steering functionality is enabled. For example, a memory 24 of the access point device 2 can store a steering setting 29 that indicates whether steering is enabled for the network environment, for a particular client device 4, or both. In one or more embodiments, the access point device 2 includes a user interface that allows for the configuration of the steering setting 29, for example, by a user or an administrator. In one or more embodiments, the steering setting 29 is retrieved from a network resource 6 by the steering controller 26. As discussed with reference to FIGS. 3 and 4, a MAX threshold can be set for attempting to steering a client device 4. This MAX threshold can also be stored in the memory 24 of the access point device 2. Basing steering attempts to a candidate BSS on a MAX threshold minimizes disruptions and conserves network resources and prevents steering to a candidate BSS when no significant improvement in network performance.

At step S504, the steering controller 26 starts a periodic NAC collection timer for a collection period setting. In one or more embodiments, step S504 occurs upon detection of a transition of the target client device 4 from one to location to another location. The collection period setting can be stored in a memory 24 of the access point device 2 and can be configurable via a user interface.

At step S506, the steering controller 26 determines if the collection period setting has been reached or an expiration of a NAC collection period. For example, the collection period setting can be set to a specified duration and this duration can be compared to the current value of the periodic NAC collection timer to determine whether the specified duration has been reached. If the NAC collection period has expired based on the NAC collection timer, then the steering controller 26 proceeds with execution at step S508. Otherwise, the steering controller 26 waits for the expiration to proceed with execution at step S508. For example, the steering controller 26 can be based on a predetermined duration of time, a semaphore, a timer, or any other flag periodically determine whether the NAC collection period has expired or been reached. In this way, one or more network resources are conserved as NAC network devices are not continuously interrupted for one or more link quality parameters.

At step S508, the steering controller 26 collects or obtains one or more NAC link quality parameters (or data associated with a link quality parameter) that are unique to one or more target client devices 4, such as link quality RSSI NAC data, for each candidate BSS on one or more network devices in the network environment that is different from the corresponding one or more network devices where the one or more network devices are selected or identified based on one or more steering conditions. The one or more steering conditions can comprise any of adequately low utilization (for example, a value that indicates a threshold utilization for the network device, a steering attempt threshold (for example, a value indicative of the number of steering attempts within a certain timeframe for a particular client device), a portability or roaming identifier (for example, a value indicative of whether the client device is known to be stationary or not portable), a network parameter threshold (for example, a value associated with a link quality parameter such that a comparison of the network parameter threshold to a link quality parameter of a client device 4 indicates whether the client device 4 should be considered a target for steering), a location of the client device 4 (for example, a client device 4 at one or more locations indicated should not be considered as a target for steering), a proximity threshold (for example, a client device 4 at a distance indicated by the proximity threshold should not be considered for steering), any other steering condition, or any combination thereof. A client device 4 that is blocked from steering based on one or more steering conditions is not considered as a target for steering by the steering controller 26 and as such no link quality parameter data is collected for one or more NAC network devices associated with a candidate BSS for such a client device 4. For example, no data is collected to determine a delta link quality for a client device 4 that is determined to be blocked for steering. Once a client device 4 is selected or identified for steering, then the steering controller 26 obtains or otherwise collects NAC link quality parameter data from each NAC network device with a BSS that is different than the current or original BSS associated with the selected or identified target client device 4. In this way, if a client device 4 is not subject to steering (a blocked client device), then resources are conserved by not obtaining NAC link quality parameter data associated with a blocked client device.

As an example, with reference to FIG. 4, the steering controller 26 can determine that for target client device 4C a steering condition indicates that the proximity to extender access point devices 3A and 3B exceeds a proximity threshold such that link quality parameter data should not be collected for these network devices. As another example, with reference to FIG. 4, the steering controller 26 can determine that for client device 4B that a steering condition indicates that too many steering attempts have occurred within an indicated duration and thus client device 4B remains associated with the first BSS of the access point device 2 even after the client device 4B is transitioned to location 304. As yet another example, with reference to FIG. 4, the steering controller 26 can determine that any one or more current link quality parameters associated with the client device 4A meet the requirements of one or more associated thresholds such that no link quality parameter data should be collected from any candidate BSS on any other NAC network devices.

At step S510, the steering controller 26 determines if any one or more NAC link quality parameters are available for any one or more target client device 4 for an associated candidate BSS on a network device are available. For example, in previous steps no target client devices can be identified as each can be eliminated based on one or more steering conditions or a steering setting 29, no NAC link quality parameters are collected from candidate BSSs due to high utilization, no NAC link quality parameters are able to be collected for the target client device 4, or any combination thereof. If no NAC data, one or more NAC link quality parameters, are available, then the method continues to step S504.

If one or more NAC link quality parameters or NAC data are determined to be available or obtained from step S508, then at step S512, the steering controller 26 determines the delta link quality for each client device 4 (*i*) and network device (j) pair and/or combination for which link quality data was received or obtained in step S508 and a maximum difference between the link quality data associated with each network device (with a candidate BSS) and the corresponding link quality data associated with a target client device 4, for example, as discussed with reference to EQUATIONS 1-2.

At step S514, the steering controller 26 determines if for a target client device 4 (*i*) (the corresponding maximum difference determined at step S512 for a network device (j) is, for example, greater than or equal to a link quality trigger threshold for an associated link quality parameter, such as discussed with reference to EQUATIONS 3-4. If no maximum difference meets the link quality trigger threshold requirements, then the steering controller 26 proceeds to step S504 and restarts the periodic NAC collection timer. If the link quality trigger threshold requirements are met, then the steering controller 26 proceeds to step S516.

At step S516, the steering controller 26 attempts to steer the selected or identified target client device 4 to the BSS associated with the determined or identified NAC network device j at step S514. For example, the steering controller 26 can send one or more instructions to the target client device 4 to switch to the BSS on the NAC network device j as identified in step S514. The steering of the target client device 4 can be attempted via IEEE 802.11v (BSS transition management) soft-steering. The method proceeds to S504 to restart the periodic NAC collection timer and proceed with execution of the subsequent steps as discussed.

Figure 6:
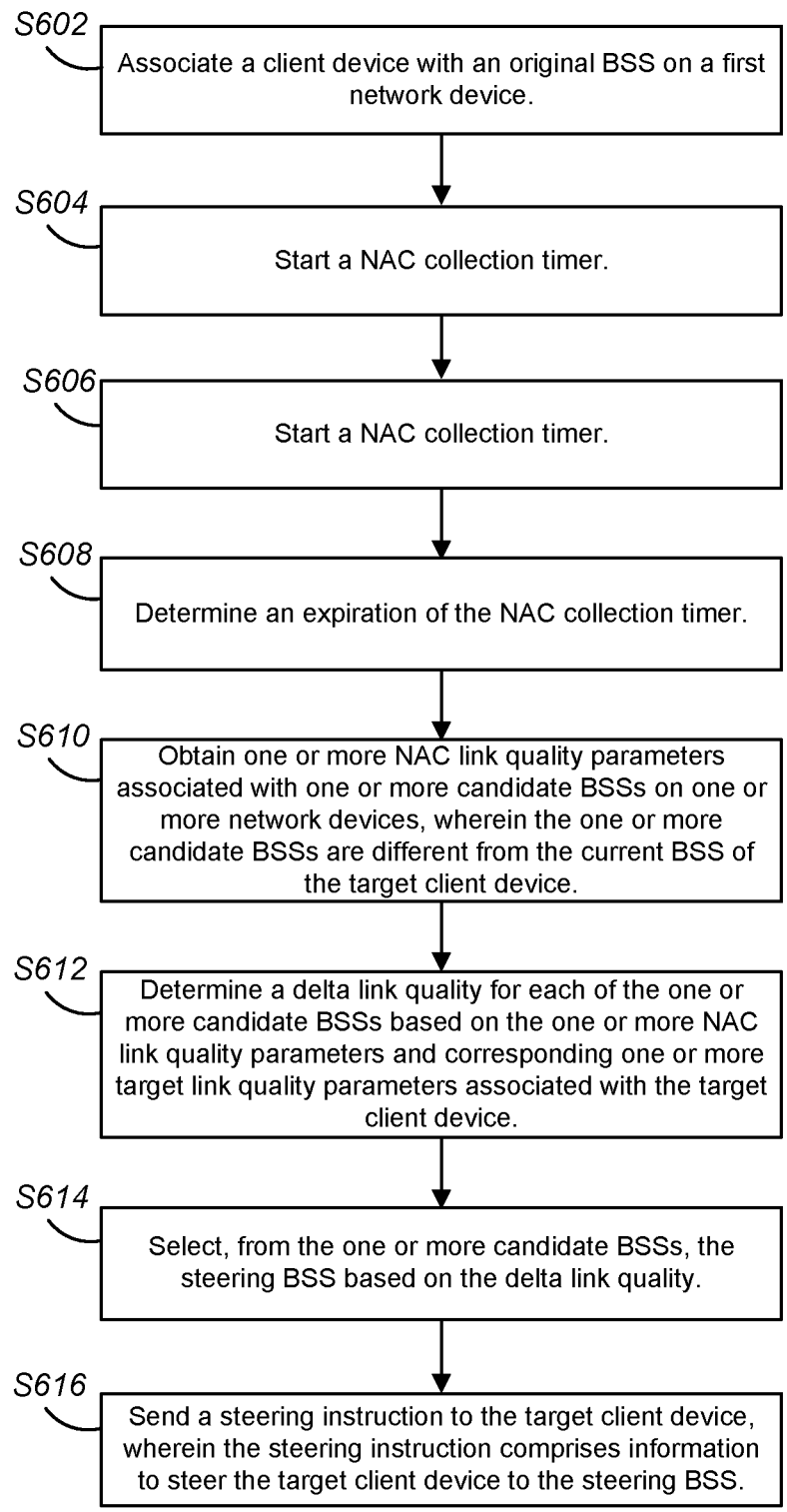
FIG. 6 is a flow chart illustrating a method for providing optimized network performance by steering a client device, according to one or more aspects of the present disclosure.

FIG. 6 is a flow chart illustrating a method for providing optimized network performance by steering a client device, according to one or more aspects of the present disclosure.

In one or more embodiments, a network device may include a steering controller 26, such as a network device controller or HNC, that may be programmed with or to execute one or more instructions (for example, software or application 25) to perform steps for steering a target client device 4 from a current BSS to a candidate BSS, that is different than the current BSS, on a NAC network device based on obtaining one or more link quality parameters. In FIG. 6, it is assumed that the network devices include their respective controllers and their respective software stored in their respective memories, as discussed above in reference to FIGS. 1-5, which when executed by their respective controllers perform the functions and operations in accordance with the example embodiments of the present disclosure (for example, including dynamic steering of client device by a steering controller 26 of an access point device).

The steering controller 26 executes one or more computer-readable instructions, stored in a memory, for example, a memory 24 of an access point device 2, that when executed perform one or more of the operations of steps S602-S616. In one or more embodiments, the one or more computer-readable instructions may be one or more software applications, for example, a software 25 of an access point device 2. While the steps S602-S616 are presented in a certain order, the present disclosure contemplates that any one or more steps can be performed simultaneously, substantially simultaneously, repeatedly, in any order or not at all (omitted).

At step S602, a client device 4 is brought within proximity of a network environment and associated with an original or a current BSS on a first network device within the network environment. The network environment can comprise a plurality of network devices including other client devices, an access point device 2, one or more extender access point devices 3, any other network device, or a combination thereof. A steering controller 26 (for example, of an access point device 2) can store a steering setting 29 that can be used to determine whether steering is available for the client device 4. The steering controller 26 can determine that the client device 4 can be steered (such as, select or identify the client device 4 as a target client device 4) based on the steering setting 29 and one or more steering conditions.

At step S604, the steering controller 26 determines that steering is enabled for the target client device, for example, by determining if a steering setting stored in a memory 24 of the access point device is set or enabled. If steering is enabled, then at step S606, a NAC collection timer can be started by the steering controller 26. At step S608, the steering controller 26 can determine expiration of a NAC collection period based on the NAC collection timer. For example, the NAC collection timer can be set for a time period such that at expiration of the time period (a NAC collection period) triggers one or more events, such as steps S610-S616.

At step S610, one or more NAC link quality parameters associated with one or more candidate BSSs on one or more network devices are obtained or otherwise received by the steering controller 26. The one or more candidate BSSs are different from the current or original BSS on the first network device (the BSS associated with the target client device 4A at step S602). The one or more NAC link quality parameters can comprise any of a link quality received signal strength indicator NAC data, a link quality received signal received power NAC data, a physical layer rate NAC data, or any combination thereof. The steering controller can receive or otherwise obtain one or more target link quality parameters associated with the current or original BSS of the target client device 4, compare the one or more target link quality parameters to associated one or more link quality thresholds, and then only request or obtain the one or more NAC link quality parameters based on the comparison, for example, only request a NAC link quality parameter that corresponds to a target link quality parameter that is below, equal to, or exceeds a link quality threshold. In this way, steering is only attempted, and thus one or more NAC link quality parameters are only requested or otherwise obtained, based on the comparison, for example, when an RSSI associated with the target client device 4 is below an RSSI link quality threshold.

At step S612, the steering controller 26 determines a delta link quality for each of the one or more candidate BSSs based on the one or more NAC link quality parameters and corresponding one or more target link quality parameters associated with the target client device 4 is determined. For example, the delta link quality can be determined based on EQUATION 1. Additionally, the steering controller 26 can determine a maximum (MAX) delta link quality from all of the determined delta link qualities, for example, using EQUATION 2. The steering controller 26 can further determine whether the maximum delta link quality meets a link quality trigger threshold, for example, using EQUATIONS 3 or 4.

At step S614, the steering controller selects, from the one or more candidate BSSs, a steering BSS based on the delta link quality, such as the delta link quality from step S612 including, but not limited to, a determination of any one or more of EQUATIONS 1-4 or any combination thereof. Then, at step S616, the steering controller 26 sends a steering instruction to the target client device 4 to attempt to steer the target client device 4 to the steering BSS. The steering instruction comprises information to steer the target client device to the steering BSS. If the steering attempt is successful, then the process ends. If the steering is not successful, the steering controller 26 can attempt to steering the client device 4 to the next identified steering BSS from step S614 if more than one candidate BSS meets the requirements of step S614. The process can restart the NAC collection timer after attempting to steer the target client device 4, after all steering attempts fail and/or succeed, at any steps S606-S616, or any combination thereof.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus, or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations, and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A steering controller for steering a target client device from a current basic service set (BSS) to a steering BSS, the steering controller comprising:
   a memory storing one or more computer-readable instructions; and
   a processor configured to execute the one or more computer-readable instructions to:
      obtain, based on a non-associated client collection period, one or more non-associated client (NAC) link quality parameters associated with one or more candidate BSSs on one or more network devices, wherein the one or more candidate BSSs are different from the current BSS of the target client device;
      determine a delta link quality for each of the one or more candidate BSSs based on the one or more NAC link quality parameters and corresponding one or more target link quality parameters associated with the target client device;
      select, from the one or more candidate BSSs, the steering BSS based on the delta link quality; and
      send a steering instruction to the target client device, wherein the steering instruction comprises information to steer the client device to the steering BSS.

2. The steering controller of claim 1, wherein the processor is further configured to execute the one or more computer-readable instructions to:
   start a NAC collection timer;
   determine expiration of the NAC collection period based on the NAC collection timer; and
   wherein the obtaining the one or more NAC link quality parameters is based on the expiration of the NAC collection period.

3. The steering controller of claim 1, wherein the one or more NAC link quality parameters comprise any of a link quality received signal strength indicator NAC data, a link quality received signal received power NAC data, a physical layer rate NAC data, or any combination thereof.

4. The gateway device of claim 1, wherein the selecting the steering BSS based on the delta link quality comprises:
   determining a maximum delta link quality based on the delta link quality determined for each of the one or more candidate BSSs; and
   comparing the maximum delta link quality to an associated link quality trigger threshold.

5. The steering controller of claim 1, wherein the processor is further configured to execute the one or more computer-readable instructions to:
   determine that steering is enabled for the target client device.

6. The steering controller of claim 1, wherein the processor is further configured to execute the one or more computer-readable instructions to:
   compare the one or more target link quality parameters to associated one or more link quality thresholds; and
   wherein obtaining the one or more NAC link quality parameters is based on the comparison.

7. The of claim 1, wherein obtaining the one or more NAC link quality parameters comprises:
   selecting the one or more network devices based on one or more steering conditions; and
   wherein NAC link quality parameters are obtained only from the selected one or more network devices.

8. A method of a steering controller for steering a target client device from a current basic service set (BSS) to a steering BSS, the method comprising:
   obtaining, based on a non-associated client collection period, one or more non-associated client (NAC) link quality parameters associated with one or more candidate BSSs on one or more network devices, wherein the one or more candidate BSSs are different from the current BSS of the target client device;
   determining a delta link quality for each of the one or more candidate BSSs based on the one or more NAC link quality parameters and corresponding one or more target link quality parameters associated with the target client device;
   selecting, from the one or more candidate BSSs, the steering BSS based on the delta link quality; and sending a steering instruction to the target client device, wherein the steering instruction comprises information to steer the client device to the steering BSS.

9. The method of claim 8, further comprising:
starting a NAC collection timer;
determining expiration of the NAC collection period based on the NAC collection timer; and
wherein the obtaining the one or more NAC link quality parameters is based on the expiration of the NAC collection period.

10. The method of claim 8, wherein the one or more NAC link quality parameters comprise any of a link quality received signal strength indicator NAC data, a link quality received signal received power NAC data, a physical layer rate NAC data, or any combination thereof.

11. The method of claim 8, wherein the selecting the steering BSS based on the delta link quality comprises:
determining a maximum delta link quality based on the delta link quality determined for each of the one or more candidate BSSs; and
comparing the maximum delta link quality to an associated link quality trigger threshold.

12. The method of claim 8, further comprising:
determining that steering is enabled for the target client device.

13. The method of claim 8, further comprising:
comparing the one or more target link quality parameters to associated one or more link quality thresholds; and
wherein obtaining the one or more NAC link quality parameters is based on the comparison.

14. The method of claim 8, wherein obtaining the one or more NAC link quality parameters comprises:
selecting the one or more network devices based on one or more steering conditions; and
wherein NAC link quality parameters are obtained only from the selected one or more network devices.

15. A non-transitory computer-readable medium of a steering controller storing one or more computer-readable instructions for steering a target client device from a current basic service set (BSS) to a steering BSS, the one or more computer-readable instructions that when executed by a processor of the steering controller cause the steering controller to perform one or more operations comprising:
obtaining, based on a non-associated client collection period, one or more non-associated client (NAC) link quality parameters associated with one or more candidate BSSs on one or more network devices, wherein the one or more candidate BSSs are different from the current BSS of the target client device;
determining a delta link quality for each of the one or more candidate BSSs based on the one or more NAC link quality parameters and corresponding one or more target link quality parameters associated with the target client device;
selecting, from the one or more candidate BSSs, the steering BSS based on the delta link quality; and
sending a steering instruction to the target client device, wherein the steering instruction comprises information to steer the client device to the steering BSS.

16. The non-transitory computer-readable medium of claim 15, wherein the one or more computer-readable instructions when further executed by the processor cause the steering controller to perform one or more further operations comprising:
starting a NAC collection timer;
determining expiration of the NAC collection period based on the NAC collection timer; and
wherein the obtaining the one or more NAC link quality parameters is based on the expiration of the NAC collection period.

17. The non-transitory computer-readable medium of claim 15, wherein the one or more NAC link quality parameters comprise any of a link quality received signal strength indicator NAC data, a link quality received signal received power NAC data, a physical layer rate NAC data, or any combination thereof.

18. The non-transitory computer-readable medium of claim 15, wherein the selecting the steering BSS based on the delta link quality comprises:
determining a maximum delta link quality based on the delta link quality determined for each of the one or more candidate BSSs; and
comparing the maximum delta link quality to an associated link quality trigger threshold.

19. The non-transitory computer-readable medium of claim 15, wherein the one or more computer-readable instructions when further executed by the processor cause the steering controller to perform one or more further operations comprising at least one of:
determining that steering is enabled for the target client device; and
comparing the one or more target link quality parameters to associated one or more link quality thresholds, and wherein obtaining the one or more NAC link quality parameters is based on the comparison.

20. The non-transitory computer-readable medium of claim 15, wherein obtaining the one or more NAC link quality parameters comprises:
selecting the one or more network devices based on one or more steering conditions; and
wherein NAC link quality parameters are obtained only from the selected one or more network devices.

* * * * *

UNITED STATES PATENT AND TRADEMARK OFFICE
CERTIFICATE OF CORRECTION

| | | |
|---|---|---|
| PATENT NO. | : 12,342,187 B2 | Page 1 of 1 |
| APPLICATION NO. | : 17/744066 | |
| DATED | : June 24, 2025 | |
| INVENTOR(S) | : Strater et al. | |

It is certified that error appears in the above-identified patent and that said Letters Patent is hereby corrected as shown below:

In the Claims

Column 24, Line 46, Claim 7: Please correct "The of claim 1," to read --The steering controller of claim 1,--

Signed and Sealed this
Eleventh Day of November, 2025

John A. Squires
*Director of the United States Patent and Trademark Office*